(12) United States Patent
Yae

(10) Patent No.: US 9,877,143 B2
(45) Date of Patent: Jan. 23, 2018

(54) METHOD AND APPARATUS FOR CONTROLLING BLUETOOTH LOAD

(71) Applicants: Hyundai Motor Company, Seoul (KR); Kia Motors Corporation, Seoul (KR)

(72) Inventor: Seong Soo Yae, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 153 days.

(21) Appl. No.: 14/534,983

(22) Filed: Nov. 6, 2014

(65) Prior Publication Data

US 2016/0014547 A1    Jan. 14, 2016

(30) Foreign Application Priority Data

Jul. 11, 2014 (KR) ........................ 10-2014-0087688

(51) Int. Cl.
*H04Q 7/00* (2006.01)
*H04W 4/00* (2009.01)

(52) U.S. Cl.
CPC ........... *H04W 4/008* (2013.01); *H04W 4/005* (2013.01)

(58) Field of Classification Search
CPC ... H04W 76/00; H04W 8/005; H04W 76/025; H04M 1/6058
See application file for complete search history.

(56) References Cited

U.S. PATENT DOCUMENTS

| 7,715,791 | B2 | 5/2010 | Matsuda |
| 8,280,452 | B2 * | 10/2012 | Azuma ............... H04M 1/6075 379/88.16 |
| 8,892,175 | B2 * | 11/2014 | Kirsch ............... H04M 1/6091 455/569.2 |
| 8,909,302 | B2 * | 12/2014 | Matsushita ......... H04M 1/6075 455/41.2 |
| 2007/0140187 | A1 * | 6/2007 | Rokusek ................ H04L 67/16 370/338 |

FOREIGN PATENT DOCUMENTS

| JP | 2002-290416 | 10/2002 |
| JP | 2007-281652 | 10/2007 |
| JP | 2012-070050 | 4/2012 |
| JP | 2012-165241 A | 8/2012 |

(Continued)

*Primary Examiner* — Dai A Phuong
*Assistant Examiner* — Julio Perez
(74) *Attorney, Agent, or Firm* — Mintz Levin Cohn Ferris Glovsky and Popeo, P.C.; Peter F. Corless

(57) ABSTRACT

An in-vehicle Bluetooth load control method and an apparatus using the same are disclosed. A Bluetooth load dispersion method for an in-vehicle head unit includes assigning and retaining priority per profile, executing a first profile. When execution of second to n-th profiles is requested, executing the second to n-th profiles, comparing priority level assigned to the first profile with priority level assigned to the second to n-th profiles, and classifying the profiles as a main service and sub services based on a result of the comparison. Wherein is a natural number equal to or greater than 2 and is a total number of profiles in the plurality of profiles. Consequently, Bluetooth load is effectively controlled in a multi Bluetooth profile environment.

16 Claims, 8 Drawing Sheets

(56) References Cited

FOREIGN PATENT DOCUMENTS

| | | |
|---|---|---|
| JP | 2013-013012 | 1/2013 |
| JP | 2013-013012 A | 1/2013 |
| JP | 2013-013013 | 1/2013 |
| KR | 10-2010-0087842 | 8/2010 |
| KR | 10-2011-0047301 A | 5/2011 |
| KR | 10-1043518 B1 | 6/2011 |

\* cited by examiner

FIG. 5

| PROFILE TYPE | PRIORITY (LOWER NUMBER INDICATES HIGHER PRIORITY) |
|---|---|
| H/Free | 1 |
| A2DP | 2 |
| SSP | 3 |
| PBAP | 4 |
| MAP | 5 |
| Other Profiles | 6 |

FIG. 6

| MAIN SERVICE | FIRST SUB SERVICE | SECOND SUB SERVICE |
|---|---|---|
| 70% | 20% | 10% |

FIG. 8

| SITUATION | EXECUTED PROFILE | ADDITIONALLY EXECUTED PROFILE | MAIN | SUB 1 | SUB 2 | SUB N | SERVICE STOP |
|---|---|---|---|---|---|---|---|
| (1)* | H/Free | PBAP | H/Free | PBAP | – | – | NOT |
| (2)* | A2DP | PBAP | A2DP | PBAP | | | NOT |
| (3)* | A2DP, SPP | PBAP | A2DP | SPP | PBAP | | NOT |
| (4)* | A2DP, SPP, PBAP | H/Free | H/Free | PBAP | | | SPP, A2DP |
| (5)* | A2DP, PBAP | H/Free | H/Free | PBAP | | | A2DP |

(1)* WHEN PHONE BOOK DOWNLOAD IS ADDITIONALLY EXECUTED DURING TELEPHONE CONVERSATION
(2)* WHEN PHONE BOOK DOWNLOAD IS ADDITIONALLY EXECUTED DURING REPRODUCTION OF MUSIC (A2DP)
(3)* WHEN PHONE BOOK DOWNLOAD IS ADDITIONALLY EXECUTED DURING LISTENING TO INTERNET RADIO
(4)* WHEN TELEPHONE CALL IS RECEIVED DURING EXECUTION OF PHONE BOOK DOWNLOAD WHILE LISTENING TO INTERNET RADIO
(5)* WHEN TELEPHONE CALL IS RECEIVED DURING EXECUTION OF PHONE BOOK DOWNLOAD WHILE REPRODUCING MUSIC IN BACKGROUND (A2DP)

METHOD AND APPARATUS FOR CONTROLLING BLUETOOTH LOAD

CROSS REFERENCE TO RELATED APPLICATIONS

Pursuant to 35 U.S.C. § 119(a), this application claims the benefit of Korean Application No. 10-2014-0087688, filed on Jul. 11, 2014, which is incorporated herein in its entirety.

BACKGROUND

Field of the Invention

The present invention relates to control of Bluetooth load and, more particularly, to a Bluetooth load dispersion method that is capable of more effectively controlling load based on a Bluetooth service within a vehicle providing a multi Bluetooth profile environment and an apparatus for performing the same.

Discussion of the Related Art

Recently, there has been a rapid development of information technology (IT) in the vehicle industry. Particularly, in recent years, a vehicle pairing technology interlocked with a communication device, such as a smartphone, to provide various services is being developed.

Generally, when a vehicle is started, a Bluetooth function of an in-vehicle head unit having a Bluetooth hands-free function is automatically enabled and, as a result, the in-vehicle head unit enters a pairing standby mode. During such a standby mode, a driver of the vehicle typically performs a pairing operation through selection of a menu on the in-vehicle head unit and the smartphone. After the pairing operation is completed, the driver may operate a hands-free telephone using the Bluetooth-enabled communication device.

In recent years, an application range of Bluetooth technologies has increased as Bluetooth technology has been developed. For example, in the past, only Bluetooth hands-free communication was provided in a vehicle. In recent years, various Bluetooth profiles (e.g., services), such as an advanced audio distribution profile (A2DP), an audio/video remote control profile (AVRCP), a phone book access profile (PBAP), and a message access profile (MAP), have been supported. In addition, in recent years, research has been actively performed regarding various Bluetooth services interlocked with the Internet. For example, new Bluetooth services are emerging due to the development of Bluetooth Low Energy (BLE) technology which allows for considerably reduced power consumption and cost while maintaining a communication range similar to conventional Bluetooth technology. In addition, it is expected that a plurality of profiles may be simultaneously served in a single Bluetooth device.

However, many developed Bluetooth modules currently are equipped with a microprocessor (Micom) or a central processing unit (CPU) having low calculation ability which is chosen to maintain low cost. A disadvantage to using multiple Bluetooth service technologies on a single device includes when a plurality of profiles are simultaneously executed on the single device and those services are abnormally interrupted due to overload or service quality deterioration.

The foregoing is intended merely to aid in the understanding of the background of the present invention, and is not intended to mean that the present invention falls within the purview of the related art that is already known to those skilled in the art.

SUMMARY

Accordingly, the present invention provides a method and apparatus for controlling Bluetooth load to reduce or even substantially obviate one or more problems due to limitations and disadvantages found in the related art.

An object of the present invention is to provide a Bluetooth load control method in a multi Bluetooth profile environment and an apparatus for performing the same. Another object of the present invention is to provide an in-vehicle Bluetooth load control method that is capable of more effectively controlling a load of a Bluetooth module microprocessor or a main CPU of an in-vehicle head unit when a plurality of profiles are simultaneously executed.

Another object of the present invention is to provide a Bluetooth load control method that is capable of effectively distributing limited CPU resources based on a priority level assigned to each of a plurality of profiles. Another object of the present invention is to provide a Bluetooth load control method that is capable of determining a foreground service and a background service based on a priority level that is pre-assigned according to the features of a given profile, thereby improving service quality.

Yet another object of the present invention is to provide a Bluetooth load control method that is capable of dynamically redistributing CPU resources for each profile when profiles are added or deleted. A further object of the present invention is to provide a Bluetooth load control method that is capable of, for resources that cannot be simultaneously occupied by a given plurality of profiles, selecting a profile which will occupy the corresponding resources based on priority level preset values for the given profiles.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, exemplary embodiments of the present invention provide a Bluetooth load dispersion method for an in-vehicle head unit which may include assigning and retaining, by a controller, a priority level for each of a plurality of profiles, executing, by the controller, a first profile of the plurality of profiles, in response to a request for execution of each of a second to an n-th of the plurality of profiles, executing, by the controller, each of the second to the n-th profiles, and comparing, by the controller, the priority level assigned to the first profile with the priority level assigned to each of the second to n-th profiles, respectively, and classifying, by the controller, each of the profiles as a main service or sub services based on a result of the comparison of the priority level, wherein n is a natural number equal to or greater than 2 and is a total number of profiles in the plurality of profiles.

One of the profiles having a highest priority may be classified as the main service. The profiles having second through (n−1)th priority levels may be classified as first to (n−1)-th sub services, respectively.

Execution of at least one of the first to (n−1)-th sub services may be stopped in response to the one of the first to the (n−1)th subservice causing deterioration of the main service. The first to (n−1)-th sub services may be provided as background services.

The priority may be assigned based on at least one attribute selected from real-time communication (real-time communication may be understood to mean, but not limited to: simultaneous or near-simultaneous communication, simultaneous or near-simultaneous transmission and receipt of data over the Bluetooth network), importance, and required service quality level for the respective profiles. A profile requiring real-time communication may be assigned a higher priority than a profile that does not require real-time communication. The Bluetooth load dispersion method may further include distributing available resources to each of the main service and the sub services. A distribution ratio of the available resources may be determined based on required service quality levels for each of the main service and the sub services, respectively. The available resources may be distributed such that service quality of the main service is not deteriorated. The profiles may include at least one of: a hands-free telephony profile (HFTP), an advanced audio distribution profile (A2DP), a serial port profile (SPP), a phone book access profile (PBAP), and a message access profile (MAP). A highest priority may be assigned to the hands-free telephony profile.

In another aspect of the present invention, there is provided a computer-readable medium containing a program for executing the Bluetooth load dispersion method including program instructions that classify the profile having a highest priority level as the main service; and program instructions that classify each of the profiles having second through (n−1)th priority level as first through (n−1)th sub services, respectively. Also, program instructions that stop execution of at least one the first through (n−1)th subservice in response to the one of the first to the (n−1)th subservice causing deterioration of the main service may be included. Further, aspects of the present invention may include program instructions that assign a priority level to at least one of the profiles based on at least one attribute selected from the group consisting of real-time communication, importance, and required service quality level of the respective profiles; and program instructions that assign a higher priority level to a profile that requires real-time communication than a profile that does not require real-time communication. And yet further, aspects of the present invention may include program instructions that distribute available resources to each of the main service and the sub services; program instructions that determine a distribution ratio of the available resources based on required service quality levels for each of the main service and the sub services, respectively; and program instructions that distribute the available resources to prevent deterioration of service quality of the main service In a further aspect of the present invention, an in-vehicle head unit equipped with a Bluetooth communication function may include a controller configured to store priority information pre-assigned to each of a plurality of profiles in a predetermined recording region, execute a first profile, in response to a request for execute of second to n-th profiles, execute each of the second to n-th profiles, and comparing a priority level assigned to the first profile with priority levels assigned to each of the second to n-th profiles, and classify the profiles as a main service or sub services based on a result of the comparison of the priority levels, wherein n is a natural number equal to or greater than 2 and is a total number of profiles in the plurality of profiles. A profile having a highest priority level may be classified as the main service. The profiles having the second through (n−1)th priority levels may be classified as first to (n−1)-th sub services, respectively. Further, execution of at least one of the first to (n−1)-th sub services causing deterioration of the main service may be prevented or at least lessened. The first to (n−1)-th sub services, respectively, may be provided as background services. In addition, priority levels may be assigned based on at least one attribute selected from real-time communication, importance, and required service quality level of the respective profiles. A profile requiring real-time communication may be assigned a higher priority than a profile not requiring real-time communication. The controller of the in-vehicle head unit may further be configured to distribute available resources to each of the main service and the sub services. A distribution ratio of the available resources may be determined based on service quality levels required for each of the main service and the sub services, respectively. The available resources may be distributed to prevent or lessen deterioration of quality of the main service. The available resources may include at least one of central processing unit (CPU) resources, memory resources, a speaker, and a microphone. The profiles may include at least one of a hands-free telephony profile (HFTP), an advanced audio distribution profile (A2DP), a serial port profile (SPP), a phone book access profile (PBAP), and a message access profile (MAP).

A highest priority may be assigned to the hands-free telephony profile. The in-vehicle head unit may be equipped with a central processing unit (CPU) configured to process data and control signals for use in Bluetooth communication.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description when taken in conjunction with the accompanying drawings, in which:

FIG. 5 is an exemplary priority assignment table illustrating a priority assignment method per profile according to an exemplary embodiment of the present invention;

FIG. 6 is an exemplary view illustrating a load dispersion method per profile in a multi Bluetooth profile environment according to an exemplary embodiment of the present invention;

FIG. 8 is an exemplary view illustrating a resources distribution scenario per situation according to an exemplary embodiment of the present invention.

DETAILED DESCRIPTION

Figure 1:
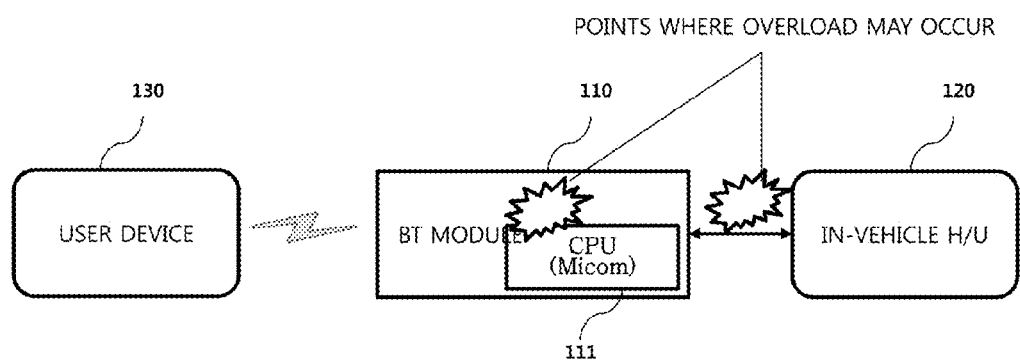
FIG. 1 is an exemplary view illustrating a scenario of load generation due to Bluetooth communication in an in-vehicle Bluetooth system according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

A storage device is understood to refer to any medium capable of storing processes or data, in any form, and may for example include hard drives, memory, smart cards, flash drives, etc. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the exemplary embodiments of the present invention are described to be integrated into a single element or to be operated as a single element, the present invention is not necessarily limited to such embodiments. According to exemplary embodiments, all of the elements may be selectively integrated into one composite structure or more and be operated as one or more composite structures within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in a computer readable medium such that the computer program is read and executed by one or more computers to implement embodiments of the present invention. Computer program storage media may include magnetic recording media, optical recording media, carrier wave media, or the like.

It will be understood that, although the terms "first", "second", "A", "B", "(a)", "(b)", etc. may be used herein to describe various elements of the present invention, these terms are only used to distinguish one element from another element and essential, order, or sequence of corresponding elements are not limited by these terms.

Hereinafter, an exemplary Bluetooth load control method and apparatus according to the present invention will be described in detail with reference to the accompanying drawings.

FIG. 1 is an exemplary view illustrating a scenario of load generation due to Bluetooth communication in an in-vehicle Bluetooth system according to an exemplary embodiment of the present invention. Referring to FIG. 1, the in-vehicle Bluetooth system may include a Bluetooth module 110, an in-vehicle head unit 120, and a user device 130. The user device 130 may include a mobile phone, a smartphone, a laptop computer, and a headset equipped with a Bluetooth function.

The Bluetooth module 110 may be connected to the in-vehicle head unit 120 via a communication line. The Bluetooth module 110 may be equipped with a CPU 111, such as a microprocessor (Micom). The CPU 111 of the Bluetooth module 110 may be configured to process control signals and user data received from the in-vehicle head unit 120 or control signals and user data transmitted to and received from the Bluetooth-paired user device 130 via a wireless connection. The user data may include voices, images, video streams, and phone book information.

As the amount of control signals and user data transmitted and received between the in-vehicle head unit 120 and the user device 130 increases, the load associated with the CPU 111 of the Bluetooth module 110 may increase. The increase in load of the CPU 111 may cause a delay in processing of control signals and user data. As a result, excessive increase in load of the CPU 111 may deteriorate service quality.

For example, when the load of the CPU 111 is not properly managed, a video reproduced through the in-vehicle head unit 120 may be of poor quality (e.g., may not be output properly, or may be output with interruptions, etc.). For another example, during a Bluetooth hands-free voice conversation, voice reception of the other party may be of poor quality, or the connection may be interrupted or lost.

In addition, when the load of the CPU 111 is not properly managed, phone book information, a telephone conversation list or other similar data may not be properly received from the Bluetooth-paired user device 130, (e.g., may not be received, or may stop transmitting). Also, phone book download service may be interrupted. In particular, the user may generally be required to perform an additional operation to reconnect the interrupted service.

Figure 2:
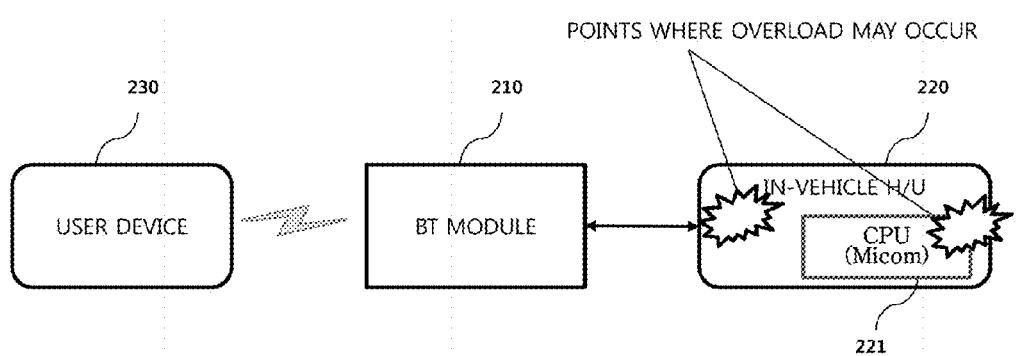
FIG. 2 is an exemplary view illustrating a scenario of load generation due to Bluetooth communication in an in-vehicle Bluetooth system according to another exemplary embodiment of the present invention.

FIG. 2 is an exemplary view illustrating a scenario of load generation due to Bluetooth communication in an in-vehicle Bluetooth system according to another exemplary embodiment of the present invention. Referring to FIG. 2, the in-vehicle Bluetooth system may include a Bluetooth module 210, an in-vehicle head unit 220, and a user device 230. The in-vehicle head unit 220 may be connected to the Bluetooth module 210 via a communication line. The in-vehicle head unit 220 may be equipped with a CPU 221, such as a microprocessor (Micom). The CPU 221 of the in-vehicle head unit 220 may be configured to process control signals and user data received from the Bluetooth module 210 or a user's input voice and transmit the processed control signals and user data or the processed user's voice to the Bluetooth module 210.

As the number of control signals and amount of user data transmitted and received between the in-vehicle head unit 220 and the Bluetooth module 210 increases, load of the CPU 111 of the in-vehicle head unit 220 may also increase. The increase in load of the CPU 221 may cause a delay in processing of the control signals and the user data. As a result, excessive increase in load of the CPU 221 may deteriorate service quality. For example, when the load of the CPU 221 is not properly managed, a video reproduced through the in-vehicle head unit 220 may be of poor quality. As another example, during a Bluetooth hands-free voice conversation, a voice of the other party may be of poor sound quality. In addition, when the load of the CPU 221 is not properly managed, phone book information, a telephone conversation list or other similar data may not be properly received from the Bluetooth-paired user device 230, (e.g., may not be received, or may stop transmitting). Also, phone book download service may be interrupted. In particular, a user may generally be required to perform an additional operation to reconnect the interrupted service. Furthermore, when the load of the CPU 221 is not properly managed, a screen of the in-vehicle head unit 220 may become frozen or the use of other functions, including a navigation function, included in the in-vehicle head unit 220, may be limited due to deterioration of performance of the CPU 221.

In the examples illustrated in FIGS. 1 and 2, the Bluetooth module and the in-vehicle head unit are physically separated from each other and connected to each other via the communication line. In a further exemplary embodiment of the present invention, on the other hand, the Bluetooth module may be incorporated into the in-vehicle head unit.

Figure 3:
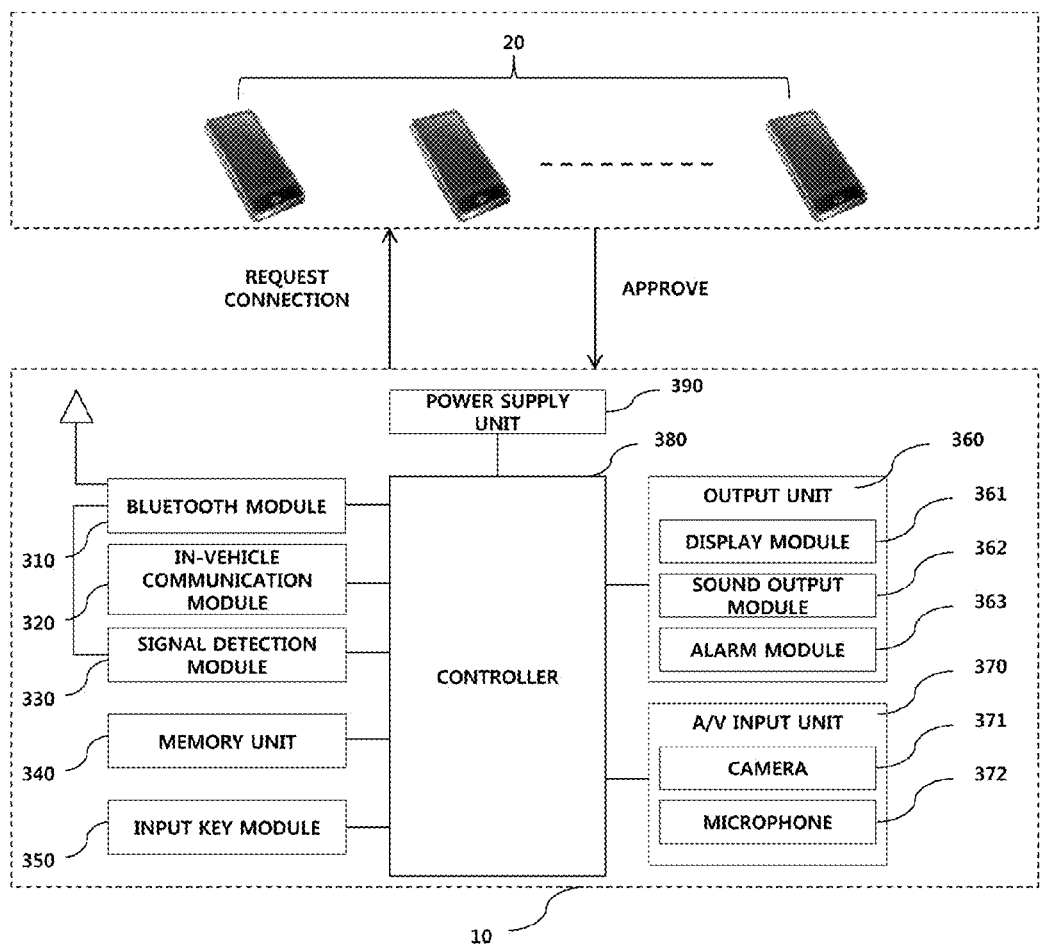
FIG. 3 is an exemplary view showing a configuration of an in-vehicle Bluetooth system according to an exemplary embodiment of the present invention.

FIG. 3 is an exemplary view showing a configuration of an in-vehicle Bluetooth system according to an exemplary embodiment of the present invention. As shown in FIG. 3, the in-vehicle Bluetooth system may include a user device 20 and an in-vehicle head unit 10.

The in-vehicle head unit 10 may include a Bluetooth module 310, an in-vehicle communication module 320, a signal detection module 330, a memory unit 340, an input key module 350, an output unit 360, an audio/video (A/V) input unit 370, a controller 380, and a power supply unit 390. The controller 380 may be configured to operate an in-vehicle communication module 320, a signal detection module 330, a memory unit 340, an input key module 350, an output unit 360, an audio/video (A/V) input unit 370, a controller 380, and a power supply unit 390. The Bluetooth module 310 may include a baseband module configured to process a baseband signal according to a Bluetooth standard, a power amplifier configured to amplify the baseband signal, a band pass filter (BPF) configured to convert the amplified baseband signal into a transmission frequency band or passing a signal having a desired frequency band selected from among radio frequency (RF) signals received via an antenna, a low noise amplifier (LNA) for configured to amplify the band-passed RF signal to be recognized and transmit the RF signal to the baseband module, and an antenna configured to transmit and receive the RF signal.

The in-vehicle communication module 320 may be configured to communicate with an electronic control unit (ECU) disposed within the vehicle. For example, when the vehicle is started, the in-vehicle communication module 320 may be configured to receive a control signal that indicates ACC ON from the ECU that senses the starting of the vehicle. The in-vehicle communication module 320 may be configured to then transmit the control signal to the controller 380. The controller 380 may be configured to apply power to the in-vehicle head unit and commence an automatic pairing procedure.

The signal detection module 330 may be configured to detect a received signal strength indicator (RSSI) received from the user device 20 and measure strength of the detected signal. In addition, the signal detection module 330 may be configured to identify a user device 20 that may be paired based on the strength of the detected signal and transmit the identified user device 20 to the controller 380.

The memory unit 340 may be configured to store one or more programs for operating the controller 380 and any lower modules operated by the controller 380 and may be configured to temporarily store input/output data (e.g., phone book information, a telephone conversation list, messages, still images, videos, application programs, and the like). The application programs may include programs for Bluetooth communication, navigation, games, chatting, web surfing, schedule management, multimedia reproduction, and the like. In particular, the memory unit 340 may be configured to retain priority information assigned to any given profile. A priority assignment method for any profile and a method of controlling Bluetooth load according to priority assigned to any given profile will hereinafter be described with reference to the accompanying drawings.

The memory unit 340 may be configured to store data regarding various vibration and sound patterns which may be output in response to a touch input on a touchscreen. The memory unit 340 may further include at least one type of memory selected from among, but not limited to: a flash memory type memory, a hard disk type memory, a multimedia card micro type memory, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The input key module 350 may be configured to generate input data for operating the in-vehicle head unit 10. The input key module 350 may include a key pad, a dome switch, a touch pad (static pressure/electrostatic), a jog wheel, and a jog switch. The output unit 360 may be configured to generate an output relevant to a sense of sight, hearing, or touch. The output unit 360 may include a display module 361, a sound output module 352, and an alarm module 363. The display module 361 may be configured to display or output information processed by the in-vehicle head unit 10. For example, when the in-vehicle head unit 10 is in a telephone conversation mode, the display module 361 may be configured to display a user interface (UI) or graphical user interface (GUI) related to telephone conversation. In addition, when the in-vehicle head unit 10 is in a navigation mode, the display module 361 may be configured to display a user interface (UI) or graphical user interface (GUI) related to travel guidance. In addition, the display module 361 may be configured to configure and display information regarding a pairing progress state and a pairing-related menu in the pairing mode as a user interface (UI) or graphical user interface (GUI). The display module 361 may include at least one display selected from among, but not limited to a liquid crystal display, a thin film transistor-liquid crystal display, an organic light-emitting diode, a flexible display, and a three-dimensional (3D) display.

According to an exemplary configuration of the in-vehicle head unit 10, two or more display modules 361 may be provided. For example, the display modules 361 may be disposed at one side of the in-vehicle head unit 10 separately, or integrally. Alternatively, the display modules 361 may be disposed at opposite sides of the in-vehicle head unit 10.

When the display module 361 and a sensor for sensing a touch (hereinafter, referred to as a "touch sensor") constitute a mutual layer structure (hereinafter, referred to as a "touchscreen"), the display module 361 may be used as an input device in addition to an output device. The touch sensor may be configured as a touch film, a touch sheet, a touchpad, or any other appropriate type of touch sensitive device. The touch sensor may be configured to convert pressure applied to a specific portion of the display module 361 or change of capacitance generated from a specific portion of the display module 361 to an electric input signal. The touch sensor may be configured to sense pressure of a touch as well as a touched position or area.

When a touch input is detected by the touch sensor, a signal(s) that corresponds to the touch may be transmitted to a touch controller. The touch controller may be configured to then process the signal(s) and then transmit data that corresponds to the processed signal(s) to the controller 380. Accordingly, the controller 380 may be configured to recognize which portion of the display module 361 has been touched, (e.g., where on the touch screen pressure was applied).

The sound output module 362 may be configured to output audio data received from the Bluetooth module 310 or data stored in the memory unit 340 in a call signal reception mode, a telephone conversation mode, a recording mode, a voice recognition mode, or a Bluetooth pairing mode. The sound output module 362 may be configured to output a sound signal related to a function (e.g. a call signal reception sound, a message reception sound, or a pairing completion sound) performed by the in-vehicle head unit 10. The sound output module 362 may include any one or more of a receiver, a speaker, and a buzzer. In addition, the sound output module 362 may be configured to output sound via an earphone jack disposed at one side of the in-vehicle head unit 10.

The alarm module 363 may be configured to output signals to notify a user that certain events have been generated in the in-vehicle head unit 10. Examples of events generated in the in-vehicle head unit 10 may include call signal reception, message reception, key signal input, touch input, reception of vehicle state information from the in-vehicle communication module 320, and the like. The vehicle state information may include door opening information, engine overheating information, lane deviation information, fuel state information or other information. The alarm module 363 may be configured to output other signals, such as vibration signals for notification of event generation in addition to video signals or audio signals. The video signals or the audio signals may also be output through the display module 361 or the sound output module 362.

The A/V input unit 370 may be provided to input audio signals and/or video signals. The A/V input unit 370 may include an imaging device 371, (e.g., a camera, video camera, etc.) and a microphone 372. The imaging device 371 may be configured to process image frames, such as still images or videos acquired by an image sensor in a video conversation mode or in a capturing mode. The processed image frames may be displayed on the display module 361. In addition, the imaging device 371 may capture images behind the vehicle, for example when the vehicle is moved backward. The captured images may be output through the display module 361. Furthermore, the image frames processed by the imaging device 371 may be stored in the memory unit 340 and/or transmitted to a paired user device 20 via the Bluetooth module 310. According to an exemplary configuration of the in-vehicle head unit 10 and the vehicle, two or more imaging devices 371 may be provided.

Furthermore, the microphone 372, illustrated in FIG. 3, may be configured to receive external sound signals and may be configured to convert the received sound signals into electrical voice data in a telephone conversation mode, a recording mode, or a voice recognition mode. In the telephone conversation mode, the converted voice data may be transmitted to the paired user device 20 via the Bluetooth module 310. The power supply unit 390 may be configured to supply power necessary to operate the in-vehicle head unit 10. When the vehicle is powered ON, the power supply unit 390 may be configured to automatically supply power to the in-vehicle head unit 10. When the vehicle is powered OFF, the power supply unit 390 may be configured to automatically interrupt the supply of power to the in-vehicle head unit 10.

The controller 380 may be configured to execute the overall operation of the in-vehicle head unit 10. For example, the controller 380 may be configured to operate a communication function including voice communication using Bluetooth pairing, data communication, video communication, and phone book download. In addition, the controller 380 may be configured to operate an application program to be installed and driven. In addition, the controller 380 may be configured to perform pattern recognition processing that is capable of recognizing a hand-written input or a drawing input performed on the touchscreen as text and images.

The controller 380 may be configured to control input and output operations according to various control signals received from the lower modules and output to a user interface screen based thereupon. The lower modules may include, but are not limited to the Bluetooth module 310, the in-vehicle communication module 320, the signal detection module 330, the memory unit 340, the input key module 350, the output unit 360, the A/V input unit 370, and the power supply unit 390, as previously described.

In particular, the controller 380 may be configured to select and perform a service to be performed in a foreground based on priority preset per profile. When a plurality of profiles are simultaneously executed, the controller 380 may be configured to dynamically determine which CPU resources may be distributed to the respective profiles. In addition, when profiles are added or deleted, the controller 380 may be configured to dynamically redistribute the CPU resources to any of the profiles. Further, for resources that may not be simultaneously occupied by a plurality of profiles, the controller 380 may be configured to select a profile which may occupy the corresponding resources based on the priority preset per profile and may be configured to control the corresponding resources to be occupied by the selected profile. For example, when a telephone call is received during reproduction of music in a background, the controller 380 may be configured to interrupt the reproduction of the music and signal the user to answer the phone. In other words, the controller 380 may be configured to control speaker resources to be occupied by a hands-free profile. The power supply unit 390 may be configured to supply power necessary to operate the in-vehicle head unit 10.

Figure 4:
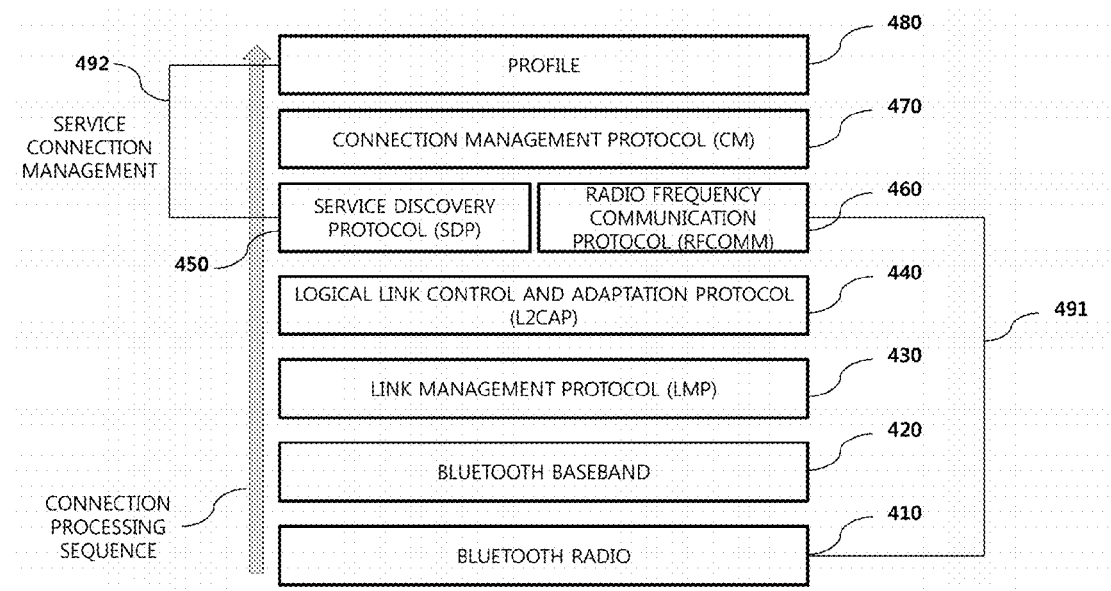
FIG. 4 is an exemplary view illustrating a Bluetooth protocol stack according to an exemplary embodiment of the present invention.

FIG. 4 is an exemplary view illustrating a Bluetooth protocol stack according to an exemplary embodiment of the present invention. Referring to FIG. 4, the Bluetooth protocol stack may include, but is not limited to a Bluetooth radio layer 410, a Bluetooth baseband layer 420, a link management protocol (LMP) layer 430, a logical link control and adaptation protocol (L2CAP) layer 440, a service discovery protocol (SDP) layer 450, a radio frequency communication protocol (RFCOMM) layer 460, a connection management protocol layer 470, and a profile layer 480.

The Bluetooth radio layer 410 may be configured to convert a radio signal in the industrial scientific and medical (ISM) frequency band of about 2400 to 2483.5 MHz into a baseband and transmit the converted signal to the Bluetooth baseband layer 420 through the antenna or the Bluetooth radio layer 410 may be configured to convert the baseband signal received from the Bluetooth baseband layer 420 into an ISM frequency band and transmit the converted signal to an upper-level layer.

The Bluetooth baseband layer 420 may be configured to modulate data received from an upper-level layer and may transmit the modulated data to the Bluetooth radio layer 410 or demodulate the baseband signal received from the Bluetooth radio layer 410 and transmit the demodulated signal to an upper-level layer. Frequency shift keying (FSK), phase shift keying (PSK), or quadrature amplitude modulation (QAM), or any now-known or later-developed modulation scheme may be used for signal modulation.

The link management protocol layer 430, which is firmware-level software for directly controlling baseband hardware, may be configured to perform a piconet management function, a link management function, and/or an encryption management function. The piconet management function may include a function of managing connection to or disconnection from a slave device, a function of switching between a master device and the slave device, a function of connection between the synchronous connection oriented (SCO) link and the asynchronous connectionless (ACL) link, and a power mode management function. The ACL link is a kind of Bluetooth data link. In exchange of packet between two devices, the ACL link operates in an asynchronous mode. Consequently, the ACL link is used to connect general data communication excluding a voice channel. On the other hand, the SCO link is a link used for synchronous data transmission. The SCO link is generally used for voice communication in real time.

The link management function may include a function of managing service quality related to a data transmission rate and/or an error rate and/or a power control function. The encryption management function may include a function related to authentication and encryption of data. The logical link control and adaptation protocol layer 440 may be connected to the Bluetooth baseband layer 420 to provide a logical channel for the upper-level layer. The term "logical channel" means a virtual channel set to transmit data received from the upper-level layer or an application layer to the lower-level layer or to transmit data received from the lower-level layer to the upper-level layer. In particular, the logical link control and adaptation protocol layer 440 may be configured to perform functions of multiplexing, demultiplexing, segmenting, and reassembling data transmitted and received between the upper-level layer and the Bluetooth baseband layer 420.

The service discovery protocol layer 450 may be configured to provide a protocol for exchanging information regarding the features of a service available in a connected Bluetooth device. The service discovery protocol layer 450 operates based on a server-client architecture. In particular, a universally unique identifier (UUID) may be assigned to each service. The server device may manage a list of available services and the details of each service in the form of a database. The client device may be configured to request and acquire information related to the corresponding service from the server.

The radio frequency communication protocol layer 460 may be configured to emulate an RS-232 9 pin serial port based on TS 07.10 of European Telecommunications Standards Institute (ETSI). The radio frequency communication protocol layer 460 may be used in the following two types of devices. A first type is a Type 1 device in which two devices are directly connected to each other via a Bluetooth link as ends over communication. The second type is a Type 2 device in which one device is an end and the other is a portion of another network. The connection management protocol layer 470 may be configured to manage connection to each profile (service).

The profile layer 480 may be configured to retain and manage detailed information regarding various services provided through Bluetooth communication. For example, profiles (services) provided via the Bluetooth communication may include a hands-free telephony profile (HFTP), an advanced audio distribution profile (A2DP), a serial port profile (SPP), a phone book access profile (PBAP), a message access profile (MAP), an audio/video remote control profile (AVRCP), a headset profile, a LAN access profile, a file transfer profile, and the like. The hands-free telephony profile is a profile used in a device having a hands-free function. The hands-free telephony profile generally supports only voice and is generally used in an in-vehicle Bluetooth device. A voice sampling frequency may vary depending upon a version of the hands-free telephony profile. As a result, the amount of data to be processed may vary. For example, H/Free 1.6 generally used for server-based voice recognition has a sampling frequency equivalent to twice that of H/Free 1.5. As a result, the amount of data to be processed may be doubled. The A2DP is a profile used to transmit music to a headset or a speaker. The amount of data processed for the A2DP depends on a bit pool value. As sound quality is increased, the amount of data to be processed is increased. The SPP is a profile used to transmit non real-time (or asynchronous) data, such as a data service of an Internet radio. For example, the SPP may be a profile used to receive data, such as images (clip art), text, and non real-time voices from a radio broadcast service in an Internet radio service. The AVRCP is a profile used to control video data as well as audio data. The PBAP is a profile used to access a phone book. Specifically, the PBAP is a profile used to download phone book information and/or telephone conversation list information stored in the Bluetooth-paired user device 20 into the in-vehicle head unit 10. The amount of data processed based on the PBAP may depend on the amount of phone book information and telephone conversation list information to be downloaded from the user device and a transmission frame size defined by the corresponding module, i.e. the size of data that can be transmitted at once. For example, when pictures to be stored in the phone book are transmitted, the amount of data to be transmitted may increase. The MAP is a profile generally used to transmit event information. A relatively low priority level may be assigned to the MAP.

Referring to FIG. 4, two connection management procedures may be performed when registering a new device for Bluetooth communication. A first procedure is a link connection management procedure 491 and the other is a service connection management procedure 492. The link connection management procedure 491 may be performed between the Bluetooth radio layer 410 and the service discovery protocol layer 450 and the service connection management procedure 492 may be performed between the service discovery protocol layer 450 and the profile layer 480.

As shown in FIG. 4, the Bluetooth connection procedure may include the link connection management procedure 491 and the service connection management procedure 492, which may be performed sequentially. The link connection may be performed through message communication between the link management protocol layer 430, the logical link control and adaptation protocol layer 440, and the service discovery protocol layer 450.

Particularly, when resources, such as a speaker, which may not be simultaneously occupied by different profiles of the in-vehicle head unit 10, are required by a plurality of profiles, the in-vehicle head unit 10 may be configured to selectively release a specific profile based on real-time communication and importance of the profiles. It should be understood that "real-time communication" refers to real-time or near-real-time action, which may occur over a Bluetooth network/transmission, including, for example, communication.

For example, when the hands-free telephony profile and A2DP are simultaneously connected, the speaker may be assigned to the hands-free telephony profile. In addition, the in-vehicle head unit 10 may be configured to connect profiles searched by the service discovery protocol layer 450 during the service connection in a sequence, predetermined, or determined at the moment of service connection. At this time, the in-vehicle head unit 10 may be configured to determine priority for providing (operating) a user-requested service based on pre-assigned priority levels for any given profile.

For example, a real-time, service may have a higher priority level than a non real-time service. When a real-time service and a non real-time service are simultaneously requested, the in-vehicle head unit 10 may be configured to control the real-time service to be selected and first provided as a main service, (i.e. a foreground service), and the non real-time service to be operated as a sub service, (i.e. background service).

FIG. 5 is an exemplary priority assignment table illustrating a priority assignment method per profile according to an exemplary embodiment of the present invention. The priority assignment table may include a profile type field 501 and a priority field 503, as illustrated. Referring to FIG. 5, the hands-free telephony profile may be defined as a profile having the highest priority. When a given profile has a lower numerical value, such a profile has higher priority level for service. A higher priority level may be assigned in order of the A2DP, the SPP, the PBAP, the MAP, and/or other profiles based on real-time communication, importance, and/or required service quality of the profiles.

FIG. 6 is a view illustrating an exemplary load dispersion method for given profiles in a multi Bluetooth profile environment according to an exemplary embodiment of the present invention. When a plurality of profiles are provided simultaneously, the in-vehicle head unit 10 may be configured to distribute available resources based on priority assigned to each of the given profiles. The resources may include at least one of: CPU resources, memory resources, a speaker, a microphone, and the like.

Referring to FIG. 6, the in-vehicle head unit 10 may be configured to dynamically determine the amount of resources to be distributed per profile when a new profile is additionally executed or an existing profile which is being executed is released. For example, when two profiles are being simultaneously executed, about 80% of the resources may be distributed to a main service and about 20% of the resources may be distributed to a sub service. In addition, when an additional profile is executed, as shown in FIG. 6, the in-vehicle head unit 10 may be configured to distribute about 70% of the resources to a main service, about 20% of the resources to a first sub service, and about 10% of the resources to a second sub service. Thus, the first and second sub services may be executed in a background without releasing.

Figure 7:
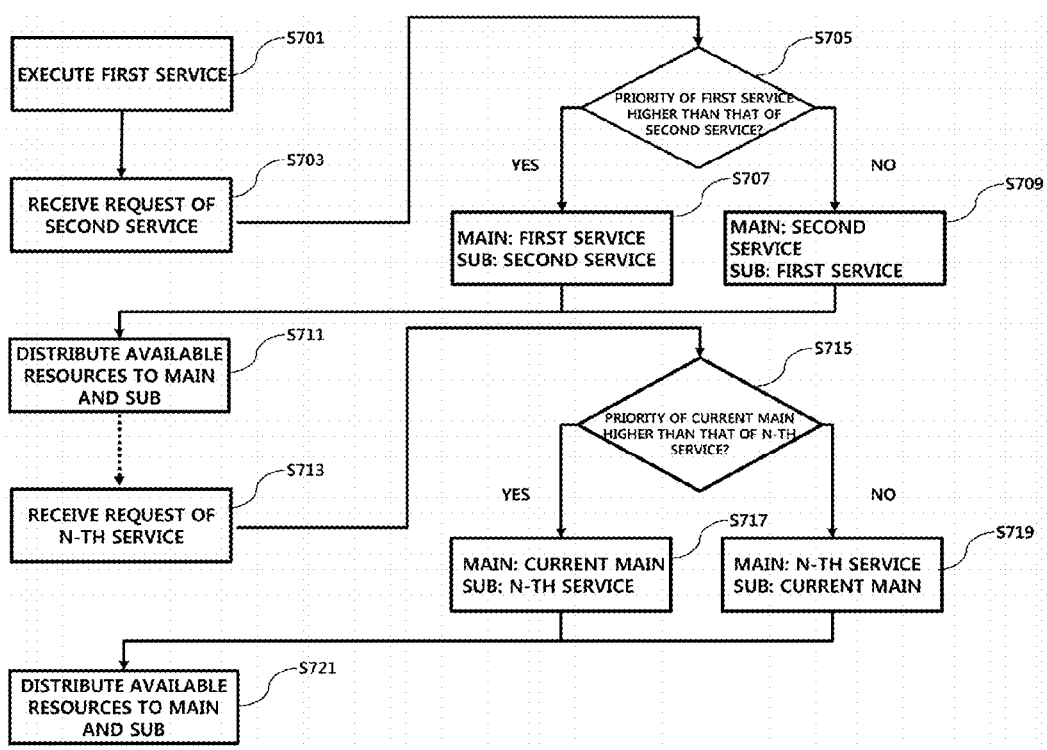
FIG. 7 is an exemplary flowchart illustrating a resources distribution procedure based on execution of an additional profile in an in-vehicle head unit according to an exemplary embodiment of the present invention.

FIG. 7 is an exemplary flowchart illustrating a resources distribution procedure based on execution of an additional profile in an in-vehicle head unit according to an exemplary embodiment of the present invention. In the following description, services and profiles will be used interchangeably for the convenience of description. Referring to FIG. 7, when a request of a second service is received in a state in which a first service is being executed, the in-vehicle head unit 10 may be configured to compare the priority level of the first service with that of the second service (S701 to S705).

When the priority level of the first service is higher than that of the second service, the in-vehicle head unit 10 may be configured to assign the first service as a main service and, when the priority level of the first service is not higher than that of the second service, the in-vehicle head unit 10 may be configured to assign the second service as the main service (S707 and S709). Services which have not been assigned as the main service may be assigned as the sub service. Subsequently, the in-vehicle head unit 10 may be configured to distribute available resources to the main service and the sub service (S711). Furthermore, when an n-th service is additionally requested, the in-vehicle head unit 10 may be configured to compare the priority level of the main service with that of the n-th service (S713 and S715). When the priority level of the first service is higher than that of the n-th service, the in-vehicle head unit 10 may retain the main service and, when the priority level of the first service is not higher than that of the n-th service, the in-vehicle head unit 10 may be configured to assign the n-th service as the main service (S717 and S719). Services which have not been assigned as the main service may be assigned as the sub service. Subsequently, the in-vehicle head unit 10 may be configured to distribute available resources to the main service and the sub service (S721).

In FIG. 7, when a new profile is added, the in-vehicle head unit 10 may be configured to classify services into a main device and a sub device based on priority levels assigned to the respective services and distributes resources to the classified services. When a profile being executed is released, the resources may be distributed in a similar manner. In other words, when execution of a specific profile is released in a state in which a plurality of profiles are being executed, the in-vehicle head unit 10 may be configured to classify the other profiles excluding the released profile into the main service and the sub service based on priority levels of the profiles. Subsequently, the in-vehicle head unit 10 may be configured to distribute available resources based on the classification result.

FIG. 8 is an exemplary view illustrating a resources distribution scenario per situation according to an exemplary embodiment of the present invention. Referring to FIG. 8, when a request for phone book download is received during a hands-free conversation, the in-vehicle head unit 10 may be configured to assign the hands-free telephony profile as a main service and the phone book access profile (PBAP) as a sub service.

As another example, when a request for phone book download is received in a state in which music is reproduced, (i.e. the advanced audio distribution profile (A2DP) is being executed), the in-vehicle head unit 10 may be configured to assign the advanced audio distribution profile (A2DP) as the main service and the phone book access profile (PBAP) as the sub service.

As another example, when a telephone call is received in a state in which an Internet radio is being output and simultaneously, a phone book is being downloaded, (i.e. the advanced audio distribution profile (A2DP) as a main service, the serial port profile (SPP) as a first sub service, and the phone book access profile (PBAP) as a second sub service are being simultaneously executed), the in-vehicle head unit 10 may be configured to release execution of the serial port profile (SPP) and the advanced audio distribution profile (A2DP), the in-vehicle head unit 10 may be configured to then assign the hands-free telephony profile and the phone book access profile (PBAP) as the main service and the sub service, respectively, and distributes resources appropriately.

As a further example, when a telephone call is received while a phone book is being downloaded and while music is reproduced in the background, (i.e. the advanced audio distribution profile (A2DP) and the phone book access profile (PBAP) are being simultaneously executed), the in-vehicle head unit 10 may be configured to release execution of the advanced audio distribution profile (A2DP), assign the hands-free telephony profile and the phone book access profile (PBAP) as the main service and the sub service, respectively, and the in-vehicle head unit 10 may be configured to distribute resources appropriately.

As is apparent from the above description, the method and apparatus according to the present invention have the following effects.

First, the present invention has an advantage of providing a Bluetooth load control method in a multi Bluetooth profile environment and an apparatus for performing the same.

Second, the present invention has an advantage of providing an in-vehicle Bluetooth load control method that is capable of more effectively controlling the load of a microprocessor of a Bluetooth module or a main CPU of an in-vehicle head unit when a plurality of profiles are simultaneously executed.

Third, the present invention has an advantage of providing a Bluetooth load control method that is capable of more effectively distributing limited CPU resources based on priority pre-assigned per profile.

Fourth, the present invention has an advantage of providing a Bluetooth load control method that is capable of determining a foreground service and a background service based on priority pre-assigned according to the features of a profile, thereby improving service quality.

Fifth, the present invention has an advantage of providing a Bluetooth load control method that is capable of dynamically redistributing CPU resources per profile when profiles are added or deleted. Sixth, the present invention has an advantage of providing a Bluetooth load control method that is capable of, for resources that can not be simultaneously occupied by a plurality of profiles, selecting a profile which will occupy the corresponding resources based on priority preset per profile.

It will be appreciated by persons skilled in the art that the effects that can be achieved through the present invention are not limited to what has been particularly described hereinabove and other advantages of the present invention will be more clearly understood from the above detailed description.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Bluetooth load dispersion method for an in-vehicle head unit comprising:
   retaining, in a memory of the in-vehicle head unit, a preassigned priority level for each of a plurality of profiles;
   executing, by a controller of the in-vehicle head unit, a first profile of the plurality of profiles based on a request for execution received through a Bluetooth module of the in-vehicle head unit;
   comparing, by the controller, the priority level assigned to the first profile with the priority level assigned to each of a second to n-th profiles, respectively, by reference to the memory, when a request for execution of each of the second to n-th profiles of the plurality of profiles is received through the Bluetooth module;

classifying, by the controller, each of the plurality of profiles as a main service or sub services based on a result of the comparison of the priority level, wherein the controller provides the sub services as background services without releasing any of the sub services;

distributing, by the controller, available resources of the in-vehicle head unit to each of the main service and the sub services to prevent deterioration of service quality of the main service;

assigning, by the controller, a priority level of at least one of the profiles based on at least one attribute selected from the group consisting of real-time communication, importance, and required service quality level of the respective profiles; and assigning, by the controller, a higher priority level to a profile that requires real-time communication than a profile that does not require real-time communication, wherein n is a natural number equal to or greater than 2 and is a total number of profiles in the plurality of profiles, and the available resources of the in-vehicle head unit include at least one resource from a group consisting of CPU resources, memory resources, a speaker, and a microphone.

2. The Bluetooth load dispersion method according to claim 1, further comprising: classifying, by the controller, the profile having a highest priority level as the main service.

3. The Bluetooth load dispersion method according to claim 2, further comprising: classifying, by the controller, each of the profiles having second through n-th priority level as first through (n–1)th sub services, respectively.

4. The Bluetooth load dispersion method according to claim 1,
further comprising: determining, by the controller, a distribution ratio of the available resources based on required service quality levels for each of the main service and the sub services, respectively.

5. The Bluetooth load dispersion method according to claim 1, wherein the profiles include at least one profile selected from the group consisting of a hands-free telephony profile (HFTP), an advanced audio distribution profile (A2DP), a serial port profile (SPP), a phone book access profile (PBAP), and a message access profile (MAP).

6. The Bluetooth load dispersion method according to claim 5, further comprising: assigning, by the controller, a highest priority to the hands-free telephony profile.

7. A non-transitory computer readable medium containing program instructions executed by a processor, the computer readable medium comprising:
program instructions that retain, in a memory of an in-vehicle head unit, a preassigned priority level for each of a plurality of profiles;
program instructions that execute a first profile of the plurality of profiles based on a request for execution received through a Bluetooth module of the in-vehicle head unit;
compare the priority level assigned to the first profile with the priority level assigned to each of a second to n-th profiles, respectively, by reference to the memory, when a request for execution of each of the second to n-th profiles of the plurality of profiles is received through the Bluetooth module;
program instructions that classify each of the plurality of profiles as a main service or sub services based on a result of the comparison of the priority level, wherein the sub services are provided as background services without releasing any of the sub services;

program instructions that distribute available resources of the in-vehicle head unit to each of the main service and the sub services to prevent deterioration of service quality of the main service;
program instructions that assign a priority level to at least one of the profiles based on at least one attribute selected from the group consisting of real-time communication, importance, and required service quality level of the respective profiles; and
program instructions that assign a higher priority level to a profile that requires real-time communication than a profile that does not require real-time communication,
wherein n is a natural number equal to or greater than 2 and is a total number of profiles in the plurality of profiles, and the available resources of the in-vehicle head unit include at least one resource from a group consisting of CPU resources, memory resources, a speaker, and a microphone.

8. The non-transitory computer readable medium of claim 7, further comprising:
program instructions that classify the profile having a highest priority level as the main service; and program instructions that classify each of the profiles having second through n-th priority level as first through (n–1)th sub services, respectively.

9. The non-transitory computer readable medium of claim 7, further comprising:
program instructions that determine a distribution ratio of the available resources based on required service quality levels for each of the main service and the sub services, respectively.

10. An in-vehicle head unit equipped with a Bluetooth communication function, the head unit including a processor configured to execute the program instructions, the program instructions when executed configured to:
store, in a memory of the in-vehicle head unit, priority information pre-assigned to each of a plurality of profiles in a predetermined recording region;
execute a first profile of the plurality of profiles based on a request for execution received through a Bluetooth module of the in-vehicle head unit;
compare a priority level assigned to the first profile with a priority level assigned to each of a second to n-th profiles, respectively, by reference to the memory, when a request for execution of each of the second to n-th profiles of the plurality of profiles is received through the Bluetooth module;
classify each of the plurality of profiles as a main service or sub services based on a result of the comparing of the priority level, wherein the sub services are provided as background services without releasing any of the sub services;
distribute available resources of the in-vehicle head unit to each of the main service and the sub services to prevent deterioration of service quality of the main service;
assign a priority level to at least one of the profiles based on at least one attribute selected from the group consisting of real-time communication, importance, and required service quality level of the respective profiles; and assign a higher priority level to a profile that requires real-time communication than a profile that does not require real-time communication,
wherein n is a natural number equal to or greater than 2 and is a total number of profiles in the plurality of profiles, and the available resources of the in-vehicle head unit include at least one resource from a group consisting of CPU resources, memory resources, a speaker, and a microphone.

11. The in-vehicle head unit according to claim 10, wherein the program instructions when executed are further configured to: classify as the main service a profile having a highest priority level.

12. The in-vehicle head unit according to claim 11, wherein the program instructions when executed are further configured to: classify the profiles having the second through n-th priority level as first to (n−1)-th sub services, respectively.

13. The in-vehicle head unit according to claim 10,
wherein the program instructions when executed are further configured to:
determine a distribution ratio of the available resources based on service quality levels required for each of the main service and the sub services, respectively.

14. The in-vehicle head unit according to claim 10, wherein the profiles include at least one profile selected from the group consisting of a hands-free telephony profile (HFTP), an advanced audio distribution profile (A2DP), a serial port profile (SPP), a phone book access profile (PBAP), and a message access profile (MAP).

15. The in-vehicle head unit according to claim 14, wherein the program instructions when executed are further configured to: assign a highest priority level to the hands-free telephony profile.

16. The in-vehicle head unit according to claim 10, wherein the in-vehicle head unit is equipped with a central processing unit (CPU) configured to process data and control signals for use in Bluetooth communication.

* * * * *